United States Patent
Nachbauer

[11] Patent Number: 5,880,948
[45] Date of Patent: Mar. 9, 1999

[54] METHOD AND APPARATUS FOR PRODUCING ANY DESIRED M-PHASE, NTH ORDER ELECTRICAL SYSTEM IN A CONVERTER-FED DEVICE

[75] Inventor: Dieter Nachbauer, Erlangen, Germany

[73] Assignee: Siemens Aktiengesellschaft, München, Germany

[21] Appl. No.: 860,838

[22] PCT Filed: Nov. 23, 1995

[86] PCT No.: PCT/DE95/01632

§ 371 Date: Oct. 1, 1997

§ 102(e) Date: Oct. 1, 1997

[87] PCT Pub. No.: WO96/18230

PCT Pub. Date: Jun. 13, 1996

[30] Foreign Application Priority Data

Dec. 6, 1994 [DE] Germany .................. 44 43 428.6

[51] Int. Cl.[6] .................................................. H02M 7/539
[52] U.S. Cl. .................................................. 363/95
[58] Field of Search .................. 363/95, 96, 97, 363/98

[56] References Cited

U.S. PATENT DOCUMENTS

| | | | |
|---|---|---|---|
| 4,665,474 | 5/1987 | Neupauer | 363/35 |
| 4,968,925 | 11/1990 | De Doncker | 318/800 |
| 5,063,532 | 11/1991 | Takeda et al. | 363/97 |
| 5,097,193 | 3/1992 | Neis et al. | 318/800 |
| 5,144,216 | 9/1992 | De Doncker | 318/800 |
| 5,148,362 | 9/1992 | Braun et al. | 363/95 |
| 5,204,607 | 4/1993 | Hugel et al. | 318/809 |
| 5,321,598 | 6/1994 | Moran | 363/98 |
| 5,329,221 | 7/1994 | Schauder | 363/97 |
| 5,351,178 | 9/1994 | Brennen et al. | 363/98 |
| 5,355,025 | 10/1994 | Moran et al. | 307/105 |
| 5,467,000 | 11/1995 | Bauer et al. | 318/800 |
| 5,585,708 | 12/1996 | Richardson | 363/98 |

FOREIGN PATENT DOCUMENTS

| | | | |
|---|---|---|---|
| 0 106 022 | 4/1984 | European Pat. Off. | H02M 5/27 |
| 0 197 445 | 10/1986 | European Pat. Off. | H02M 1/084 |
| 0 330 755 | 9/1989 | European Pat. Off. | H02J 3/01 |

OTHER PUBLICATIONS

Meusel, W. et al., "Coordinate Transformations of Multi-Term Regulation Systems for the Compensation and Symmetrization of Three-Phase Supplies," Siemens Forsch.-und Entwickl.-Ber., Bd. 6, 1977, Nr. 1, pp. 3-12.

*Primary Examiner*—Jeffrey L. Sterrett
*Attorney, Agent, or Firm*—Kenyon & Kenyon

[57] ABSTRACT

A method and apparatus for producing any desired m-phase, n-th order electrical system in a converter-fed device, in which an n-th order voltage system is formed in such a manner that a determined stationary voltage vector, which is related to the n-th order electrical system, is transformed from a reference system rotating at n-times the fundamental frequency into a fixed reference system, and up to m voltage pilot control signals are produced from these rotating voltage vectors. Using this method, any desired n-th order electrical system can be impressed on, or suppressed in, phase currents of a converter-fed device.

14 Claims, 4 Drawing Sheets

METHOD AND APPARATUS FOR PRODUCING ANY DESIRED M-PHASE, NTH ORDER ELECTRICAL SYSTEM IN A CONVERTER-FED DEVICE

FIELD OF THE INVENTION

The present invention relates to a method for producing any desired m-phase, n-th order electrical system in a converter-fed device, and to an apparatus for carrying out this method.

BACKGROUND INFORMATION

When converters are used to feed electrical systems, for example three-phase machines or three-phase mains systems, the current also contains, in addition to the desired first order positive phase-sequence system, n-th order systems which are undesirable, for example because of the additional losses that they cause.

If one wishes to suppress n-th order electrical systems, then a corresponding voltage system must be produced for this purpose, which is supplied, as pilot control for manipulated variables, to a converter-fed system.

The article "Koordinatentransforationen für Mehrgröβen-Regel-systeme zur Kompensation und Symmetrierung von Drehstrom-netzen" (Coordinate Transformations for Multi-Variable Control Systems for Power Factor Correction Balancing of Three-Phase Mains System) by W. Meusl and H. Waldmann, printed in the German journal "Siemens Forsch.—und Entwickl.—Ber.", (Siemens Research and Development Reports) Volume 6, 1977, No. 1, pages 3 to 12, describes a control system, also called a multi-variable control sytem, for a solid-state power factor corrector which is used in a three-phase arc furnace. This control system always drives thyristors of the solid-state power factor corrector such that the reactive current load on the mains system is as low as possible, as constant as possible and such that the load on the mains system overall is as balanced as possible. In the representation using symmetrical components, this task is defined as follows:

The reactive element of the positive phase-sequence system of the mains current should be as small and constant as possible. At the same time, the negative phase-sequence system should be as small as possible, overall.

Since there is no neutral connection in this arrangement, the zero phase-sequence system is always equal to zero.

The article summarizes the most important relationships between a number of component systems, and illustrates these relationships in matrices in Table 1. When phase currents ((R,S,T) components) are converted into balanced components ((0, 1, 2) components), a (0, α, β) system can also be used, as shown in Table 1. Implementation of direct conversion requires greater equipment complexity.

In this multi-variable control system for a solid-state power factor corrector, analysis of the furnace currents produces the n-phase and reactive current components of the positive phase-sequence system, characterized by index 1, and of the negative phase-sequence system, characterized by index 2. The n-phase current components of the positive phase-sequence system are not processed any further. The reactive current components of the positive phase-sequence system and both components of the negative phase-sequence system are intended to be canceled out by the power factor correction system. These components are used as reference variables in this control system. The control variables are determined from the currents on the mains system side of the power factor correction system, using the same method as for the reference variables. Since this control system essentially has to process only reference variable changes, pilot control is used. The outputs of the positive phase-sequence system reactive current component controller, of the. negative phase-sequence system in-phase current components controller and of the negative phase-sequence system reactive current component controller are transformed into phase variables, which are then converted into control signals for the thyristors of the power factor correction system. This control system is used to generate control signals for each phase of the power factor correction system, as a result of which specific values are obtained for positive phase-sequence and negative phase-sequence systems on the mains side.

This control system influences only the components of the first order positive phase-sequence and negative phase-sequence system, and not n-th order electrical systems.

In the case of a direct converter with an open circuit, harmonics can occur despite sinusoidal control of the phase voltages if the back e.m.f. produced by the load, as a rule a motor, has a waveform which is not sinusoidal. Special synchronous machines produce a back e.m.f. which may contain a high proportion of 3rd harmonics. In the case of the salient pole machine which is used very frequently, it is possible, by appropriate design of the airgap, to achieve the production of a very good sinusoidal back e.m.f. on no load, but, when loaded, field distortion occurs as a result of the pole axis being shifted with respect to the axis of the rotating field, and causes corresponding harmonics of the back e.m.f. which is produced.

SUMMARY OF THE INVENTION

Production of any desired n-th order electrical system requires a corresponding n-th order voltage system. Such an n-th order voltage system can be produced for a stationary operating point using an empirically found voltage vector by transforming this empirically determined stationary voltage vector from areference system rotating at n-times the fundamental frequency into a fixed reference system. This voltage vector, which rotates at n-times the fundamental frequency, is converted using coordinate transformation into voltage pilot control signals. The transformation variable for this transformation of the stationary voltage vector into a rotating voltage vector is determined by means of an angle which changes in accordance with the fundamental frequency. The phase of this angle is freely variable. In the case of a converter-fed three-phase machine, this may be the flux angle φ or the rotor angle λ. The transformation variable, which varies at n-times the frequency, is formed from this angle. The critical factor in the selection of the coordinate transformation is which n-th order electrical system (positive phase-sequence, negative phase-sequence or zero phase-sequence system) it is intended to produce. In addition, it is necessary to consider whether the specified method is intended to be implemented in a cartesian coordinate system (analog implementation) or in a polar coordinate system (digital implementation). Furthermore, the number of phases of the system having a mutiple of three phases must also be considered. Depending on these boundary conditions, a 2/m converter or a P/m converter, respectively, must be provided as the coordinate converter for a positive phase-sequence or negative phase-sequence system, respectively, m being equal to the number of phases of the multi-phase system. For a zero phase-sequence system, only the signal of the reference phase is required, and this is then fed to all the phases as a pilot control signal.

In a method according to the present invention, the stationary voltage vector is not predetermined empirically, but is generated from the measured actual phase current values as a function of predetermined nominal value components. To this end, the actual phase current values are converted into components in a (0, α, β) system. These components of the (0, α, β) system each contain the information about all the n-th order electrical systems. Predetermined nominal value components for the positive phase-sequence, negative phase-sequence and zero phase-sequence system and the calculated components of the (0, α, β) are used to form control difference current components in each case for the positive phase-sequence, negative phase-sequence and zero phase-sequence system, and these current components are vectorially rotated using cosine and sine angle functions at n-times the operating frequency. The result of this for the positive phase-sequence, negative phase-sequence and zero phase-sequence system is in each case two signals, which have a mutual in-phase element, depending on the phase angle. Thereafter, these signals are in each case integrated for each system, and which results in each case in a Cartesian component of a stationary voltage vector for the positive phase-sequence, negative phase-sequence and zero phase-sequence system.

This method results in a stationary voltage vector of the positive phase-sequence, negative phase-sequence and zero phase-sequence system, which voltage vectors are automatically slaved to a changed operating point in the converter-fed system. When the operating point changes, the magnitude and the phase of the n-th order electrical system also change. The components of the stationary voltage vector are changed in accordance with this change.

In another embodiment of the method according to the present invention, which is intened to be applied only to an n-th order zero phase-sequence electrical system, the stationary voltage vector is not predetermined empirically, but is generated from the measured actual phase current values. The actual phase current values are added for this purpose, and a sum signal is obtained which contains the information about the sum of all the zero phase-sequence electrical systems. This sum signal is vectorially rotated by means of cosine and sine angle functions at n-times the operating frequency, and two Cartesian components of the sum current signal are obtained, which have a mutual in-phase element, depending on the phase angle. Thereafter, these components are each integrated and this results in each case in a cartesian component of the stationary voltage vector for the zero phase-sequence system. As a result, a stationary voltage vector is obtained in a particularly simple manner, and is slaved automatically to a changed operating point.

In a further embodiment of the method according to the present invention, a stationary voltage vector of a subsystem (positive phase-sequence, negative phase-sequence and zero phase-sequence system) is in each case formed by in each case delaying the signals, which are produced by multiplication, of a subsystem, instead of by integrating them. This results in a favorable solution for avoiding additional problems when limits of the converter-fed system come into play. Not only limits resulting from the control limits of the converter being reached, but also the control of active limits of the voltage vector must be taken into account in this case. Delaying the signal from the multiplication means deliberately accepting a permanent control error even in the steady state, but is then no longer possible for any integrators to drift, which would corrupt the determination of the stationary voltage vector.

The magnitude of the permanent control error can be varied as a function of a predetermined gain factor, so that this permanent control error becomes approximately zero.

The apparatus for carrying out the method according to the present invention includes vector rotators and coordinate converters, which are sufficiently known from field-oriented control. An implementation of such components is achieved e.g., using a microprocessor, the additional integrators likewise being implemented in software when carrying out the advantageous method.

In one embodiment of the apparatus according to the present invention, first order delay elements are used instead of the integrators, a P-regulator with a downstream limiter also being arranged in the magnitude channel of this apparatus. This refinement ensures that it is not possible for any unlimited drifting to occur when the control limit of the m-phase converter is reached, as a result of which an optimum control result is achieved.

DETAILED DESCRIPTION OF THE INVENTION

Figure 1:
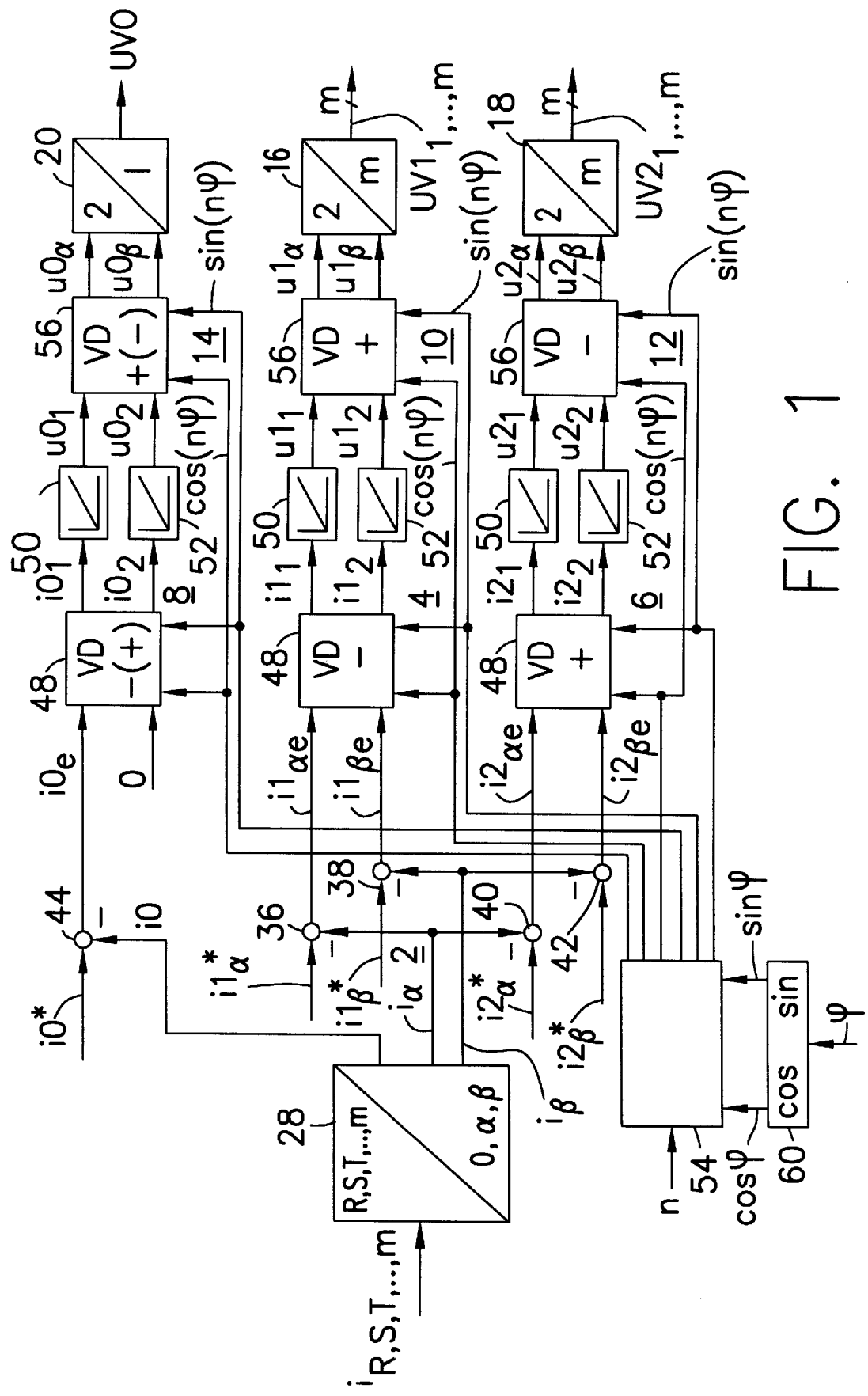
FIG. 1 shows a block diagram of an embodiment of the apparatus for carrying out the method according to the present invention.

FIG. 1 shows a block diagram of a preferred embodiment of the apparatus for carrying out the method according to the present invention for a three-phase system. This apparatus includes a device 2 for forming n-th order control difference current components $i1_{\alpha e}$, $i1_{\beta e}$, $i2_{\alpha e}$, $i2_{\beta e}$ and i0e, devices 4, 6 and 8 in each case for forming a stationary voltage vector $u1_1$, $u1_2$, $u2_1$, $u2_2$ and $u0_1$, $u0_2$ of a positive phase-sequence system i1m, a negative phase-sequence system i2m and a zero phase-sequence system i0m, and, for each subsystem i1m, i2m, i0m includes a transformation device 10, 12 and 14, downstream of each of which a coordinate converter 16, 18 and 20 is connected. Each of the two outputs of a subsystem i1m, i2m and i0m of the device 2 is connected to a device 4, 6 and 8. The transformation devices 10, 12 and 14 are linked on the input side to the outputs of the device 4, 6 and 8. The series circuit formed by the devices 4, 6 and 8, respectively, the transformation device 10, 12 or 14, and the coordinate converter 16, 18 or 20, form a control channel 22, 24 or 26, respectively, for the positive phase-sequence system i1m, the negative phase-sequence system i2m or the zero phase-sequence system i0m, respectively, of this apparatus.

The device 2 for forming n-th order control difference current components $i1_{\alpha e}$, $i1_{\beta e}$ 0r $i2_{\alpha e}$, $i2_{\beta e}$ or i0e, 0, of the positive phase-sequence system i1m, the negative phase-sequence system i2m or the zero phase-sequence system iom, respectively, includes a conversion device 28 and in each case two comparators 36, 38; 40, 42 or 44, 46, respectively, for each system i1m, i2m or i0m, respectively.

The conversion device 28 is supplied with the measured actual current values $i_R$, $i_S$, $i_T$, ..., $i_m$ of a converter-fed system. The conversion device 28 is used to convert these actual current values $i_R$, $i_S$, $i_T$, ..., $i_m$ into current components $i_\alpha$, $i_\beta$ and $i_0$. The current components $i_\alpha$, $i_\beta$ and $i_0$ thus produce a new electrical system, which is obtained from the phase variables $i_R$, $i_S$, $i_T$, ..., $i_m$ with the aid of real coefficients. In the event of any unbalance, the current components (vectors) $i_\alpha$ and $i_\beta$ are no longer of equal magnitude and are no longer at an angle of $\pi/2$ with respect to one another. The $\alpha$ and $\beta$ components of the (0, $\alpha$, $\beta$) system produce, for example, the stator-oriented components. The stator-oriented components are in this case determined by the transformation formula as per formula (12) in the said article, which applies to the instantaneous values of the phase currents $i_R$, $i_S$ and $i_T$ (and not only for vectors) as well, as is also expressed by the real coefficients. Formulae (11) and (12) in the article described above thus apply both to the instantaneous values of the phase currents $i_R$, $i_S$ and $i_T$ and to the vectors and rotating vectors. For example, the matrix of formula 12 in the article described by W. Meusl and H. Waldmann can be implemented in this conversion device 28. These n-th order determined components $i_\alpha$ and $i_\beta$ of the (0, $\alpha$, $\beta$) system are in each case supplied to an inverting input of the comparators 36, 38 and 40, 42, respectively, the component i0 being supplied to a comparator 44. Predetermined nominal value components i1*$_\alpha$, i1*$_\beta$ or i2*$_\alpha$, i2*$_\beta$ and iO*, respectively, are in each case present at the non-inverting inputs of these comparators 36, 38; 40, 42 and 44, respectively. The outputs of the comparators 36, 38; 40, 42 and 44, 46 are linked to the inputs of the device 4, 6 or 8, respectively, for forming a stationary voltage vector $u1_1$, $u1_2$; $u2_1$, $u2_2$ or $u0_1$, $u0_2$, respectively.

The devices 4, 6 and 8 for forming in each case one stationary voltage vector $u1_1$, $u1_2$, $u2_1$, $u2_2$ and $u0_1$, $u0_2$ are of approximately identical construction, so that the construction will be explained in more detail with reference to the device 4 in the positive phase-sequence system i1m. The device 4 comprises a vector rotator 48 and two integrators 50 and 52. The difference between the control channel 22 of the positive phase-sequence system and the control channel 24 of the negative phase-sequence system is that the vector rotators 48 and 56 in the positive phase-sequence system have opposite mathematical signs for the rotation angle to those of the vector rotators 48 and 56 in the negative phase-sequence system. The control difference current components $i1_{\alpha e}$ and $i1_{\beta e}$ are present at the signal inputs of the vector rotator 48. The transformation inputs of this vector rotator 48 are electrically conductively linked to the outputs of the device 54 for forming a transformation variable $\cos n\phi$ and $\sin n\phi$. The outputs of this vector rotator 48 are each electrically conductively connected to an integrator 50 or 52. The two components $i1_{\alpha e}$ and $i1_{\beta e}$ contain the information relating to the sum of all the n-th order positive phase-sequence and negative phase-sequence electrical systems, with regard to the nominal value element under consideration. The mathematical sign of the rotation of the vector, characterized by its two current components $i1_{\alpha e}$ and $i1_{\beta e}$, gives the current components $i1_1$ and $i1_2$ at the outputs of the vector rotator 48, whose in-phase elements determine the difference for the n-th order positive phase-sequence system. If the in-phase elements are integrated in a closed control loop, then a vector is obtained whose magnitude and angle correspond precisely to the stationary voltage vector $u1_1$, $u1_2$ to be found.

These determined stationary voltage vectors $u1_1$ and $u1_2$ allow an n-th order voltage system to be produced in such a manner that these stationary voltage vectors $u1_1$ and $u1_2$ are transformed using a vector rotator 56 from a reference system which rotates at n-times the angular velocity $\omega_S$, into a fixed reference system. A cartesian coordinate system ½ which rotates at n-times the fundamental frequency and has any desired phase is provided as the rotating reference system. The stator-oriented cartesian coordinate system $\alpha/\beta$ is provided as the fixed reference system. The transformation produces a voltage vector which rotates at n-times the operating frequency and has the cartesian components $u1_\alpha$ and $u1_\beta$. These components $u1_\alpha$ and $u1_\beta$ are converted by means of a coordinate converter 16 into m voltage pilot control signals $UV1_1$, ..., m. In this case, m indicates the number of phases of the system. In the case of a three-phase system illustrated here, the coordinate converter 16 provided is a ⅔ converter at whose outputs three voltage pilot control signals $UV1_1$, $UV1_2$ and $UV1_3$ are present. Only the voltage pilot control system of the reference phase is required for pilot control of a zero phase-sequence system.

The transformation variables $\cos n\phi$ and $\sin n\phi$ vary at n-times the fundamental frequency $\omega_S$. These transformation variables $\cos n\phi$ and $\sin n\phi$ are formed using the device 54 for forming the transformation variables $\cos n\phi$ and $\sin n\phi$ from an angle $\phi$ (flux angle) and a number n. The angle $\phi$ in this case varies at the instantaneous fundamental frequency. The flux angle $\phi$ or the rotor position angle $\lambda$ can be used, as appropriate, for this purpose. In practice, both angles $\phi$ and $\lambda$ are available in the control system of a converter-fed system. This angle $\phi$ is multiplied by the cosine and sine angle functions using an angle function generator 60, and is further processed in the device 54. This angle function generator 60 may also be a component of the device 54. The angle function generator 60 is used to form, from the angle $\phi$, a transformation variable $\cos \phi$ and $\sin \phi$, which rotates at the operating frequency $\omega_S$ and is converted using the device 54 and the number n into a transformation variable $\cos n\phi$ and $\sin n\phi$, which rotates at n-times the fundamental frequency $\omega_S$. The device 54 may be provided for example, by n vector rotators which are electrically connected in series, the output signals of the angle function generator 60 being present at the transformation inputs of each vector rotator.

If the components of the determined stationary voltage vector $u1_1$ and $u1_2$ are specified in polar coordinates (magnitude U, angle $\alpha$), then the production of an n-th order voltage system for the positive phase-sequence system is considerably simplified. As shown in the block diagram in FIG. 2, which shows the control channel 26 of the zero phase-sequence system, only a multiplier 62 and an adder 64 are required in the control channel 22 of the positive phase-sequence system, instead of the vector rotator 56, the device 54 and the generator 60. The angle $\phi$ or $\lambda$ and the number n are present at the inputs of the multiplier 62. The output of the multiplier 62 is connected to one input of the adder 64, the polar coordinate $\alpha$ of the stationary voltage vectors $u1_1$ and $u1_2$ then being present at the second input of said adder 64. The output of this adder 64 is linked to one input of a coordinate converter 66. The second polar component, namely the unchanged magnitude component U of the stationary voltage vectors $u1_1$ and $u1_2$, are present at the other input of this coordinate converter 66. The coordinate converter 66 uses the polar components U and $\alpha+n\phi$ to produce m voltage pilot control signals $UV1_1$, ..., $_m$. In the case of a three-phase system, a P/3 converter would have to be provided as the coordinate converter 66, at whose outputs the voltage pilot control signals $UV1_1$, $UV1_2$ and $UV1_3$ are present. Only the voltage pilot control signal of the reference phase is required for pilot control of a zero phase-sequence system. A P/1 converter can thus be provided in the control channel 26 of the zero phase-sequence system, instead of the coordinate converter 66.

Figure 2:
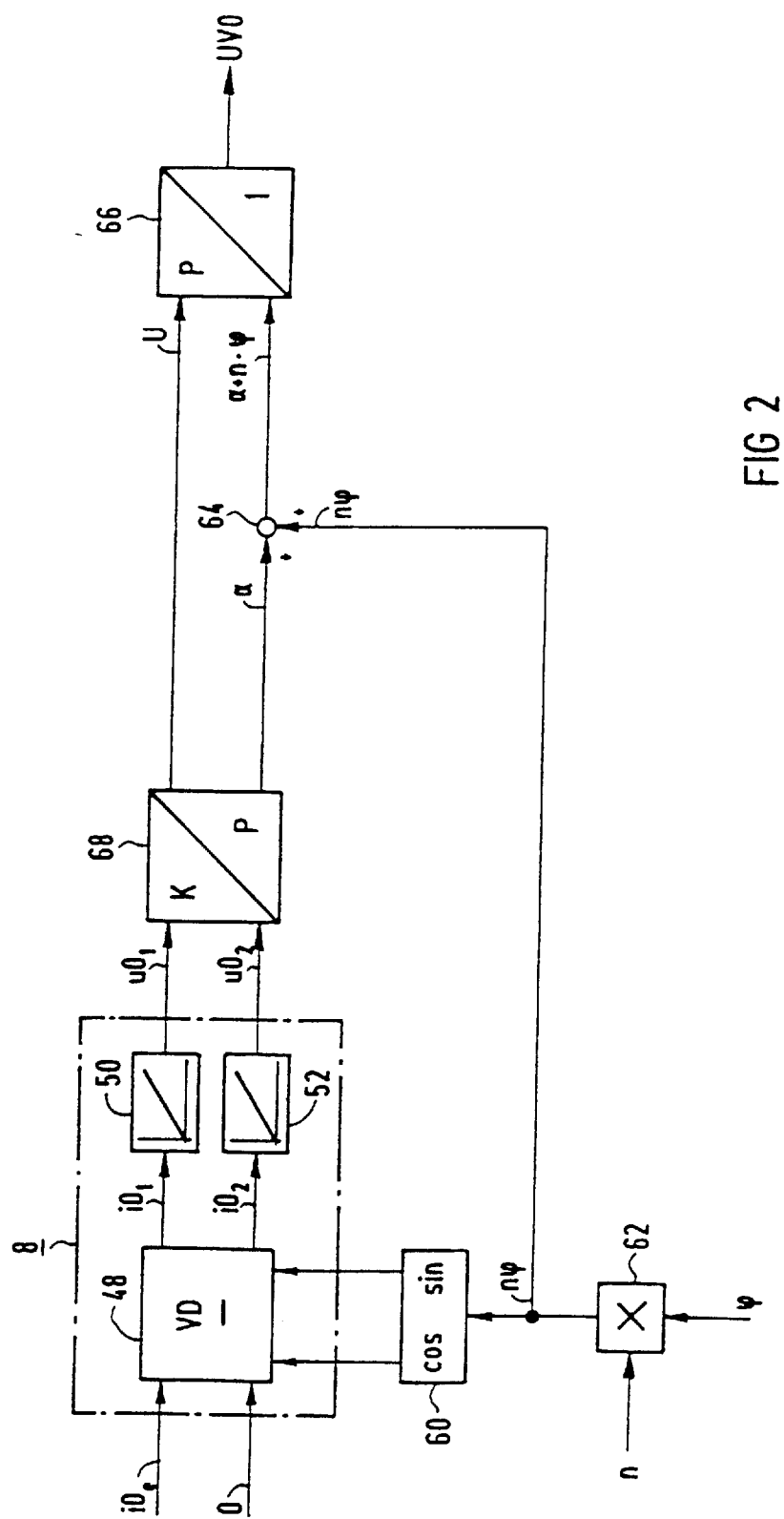
FIG. 2 shows a block diagram of an embodiment of the apparatus for carrying out the method according to the present invention using polar components.

FIG. 2 shows the block diagram of the control channel 26 of the zero phase-sequence system $i0_m$. If it is intended to influence only an n-th order zero phase-sequence system, then the control channels 22 and 24 for the positive phase-sequence and negative phase-sequence system are not required. The device 2 is likewise not required, since the current component $i0_{\alpha e}$ can also be determined in a simpler manner. The current component $i0_{\beta e}$ is equal to zero. The current component $i0_{\alpha e}$ is determined using an adder (which is not illustrated in more detail) from the measured actual current values $i_R$, $i_S$ and $i_T$ of a converter-fed system. This sum signal i0 contains the information about the sum of all the n-th order zero phase-sequence electrical systems. In practice, a specific order zero phase-sequence system will dominate, the zero phase-sequence systems of other orders in contrast being negligible. As mentioned initially, third order harmonics are produced in the phase currents in a direct converter with an open circuit and with a sinusoidal drive. These third order harmonics form a third order zero phase-sequence system.

Subject to the precondition that the sum signal i0 of the zero phase-sequence electrical systems contains only a single n-th order zero phase-sequence system, this sum signal i0 has a sinusoidal waveform with a specific magnitude at n-times the operating-frequency and a phase angle which is initially unknown. Linking the n-th order zero phase-sequence system to a sine and cosine function at the same frequency (nφ) by means of the vector 48 produces two signals $i0_1$ and $i0_2$, which are at twice the frequency and have a mutual in-phase element, depending on the phase angle. The n-th order zero phase-sequence system is governed by the in-phase element in these signals $i0_1$ and $i0_2$. If the in-phase elements are integrated in a closed control loop, then a vector is obtained whose magnitude and angle correspond precisely to the stationary voltage vectors $u0_1$ and $u0_2$ to be found.

In the steady state, the zero phase-sequence electrical system is completely eliminated, and the input signal of the two integrators 50 and 52 is correspondingly zero. If the sum signal of the zero phase-sequence electrical systems includes a plurality of subsystems, the above arrangement can be constructed for each subsystem. A non-suppressed zero phase-sequence system of any order results only in it being possible for the instantaneous value at the integrated inputs not to be zero as well, although this does not apply to the mean value over a suitable time period. The integrators 50 and 52 can be designed in accordance with this boundary condition and the desired dynamic response.

The phase of the angle φ for the transformation may assume any value. Since the device 8 provides the output signal in cartesian components $u0_1$ and $u0_2$, and the circuit shown in FIG. 2 processes signals in polar coordinates, a C/P converter 68 is provided at the interface. In addition, an angle function generator 60 is provided, which converts the angle nφ which is formed into a transformation variable cos nφ and sin nφ. Furthermore, a P/1 converter 66 is provided instead of the P/m coordinate converter 20, since a pilot control signal UV0 is supplied to all the phases when an n-th order zero phase-sequence system is suppressed.

According to the block diagram in FIG. 1, the control difference current components $i1_{\alpha e}$ and $i1_{\beta e}$; $i2_{\alpha e}$ and $i2_{\beta e}$, and $i0_e$, respectively, in the control channel 22 of the positive phase-sequence system, in the control channel 24 of the negative phase-sequence system, and in the control channel 26 of the zero phase-sequence system, respectively, are produced on the input side of the vector rotator 48. The specified control difference current components are thus determined in a fixed reference system (α/β). If it is intended to generate these control difference current components in a rotating reference system (½), then the comparators 36 and 38, 40 and 42, and 44 must be connected downstream of in each case one output of the vector rotator 48 of the positive phase-sequence system, of the negative phase-sequence system and of the zero phase-sequence system, respectively, the outputs in each case being linked to an inverting input of the comparators 36 and 38, 40 and 42, and 44. The nominal value components are now provided as identical variables in this arrangement.

Figure 3:
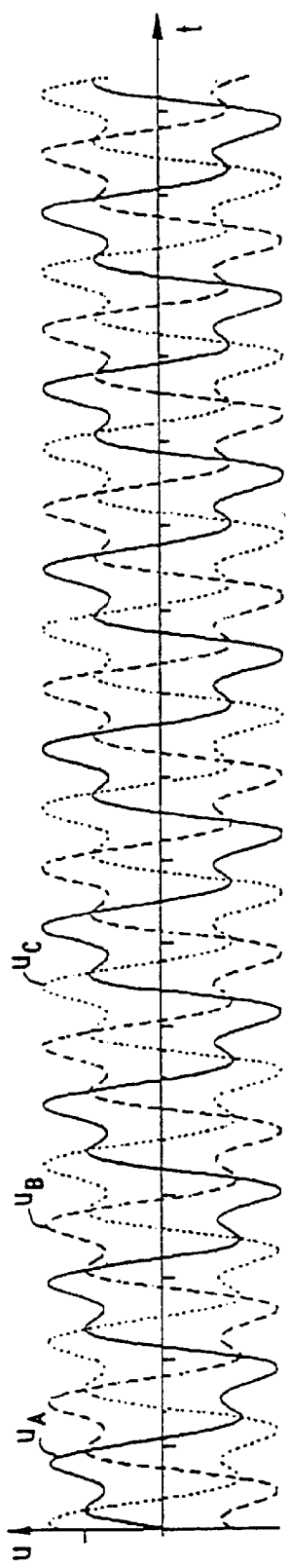
FIG. 3 shows the actual phase voltage values plotted in a diagram as a function of time t.
Figure 4:
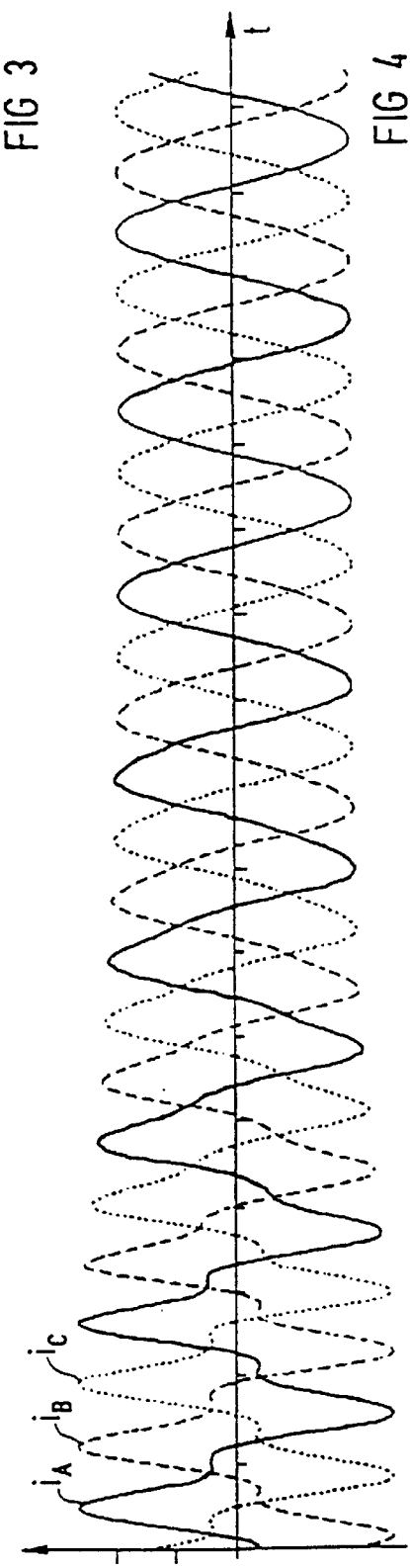
FIG. 4 shows an associated actual phase current values plotted in a diagram as a function of time t.
Figure 5:
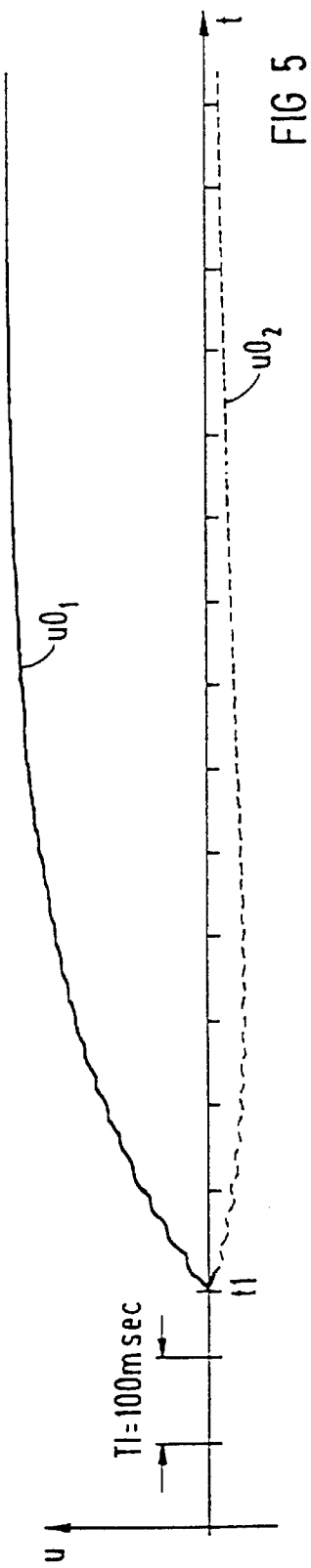
FIG. 5 showing the signal waveform at the outputs of the integrators illustrated in FIG. 2 plotted in a diagram as a function of time t.

The functionality of the circuit arrangement described above has been verified using a simulation (FIGS. 3 to 5). A zero phase-sequence voltage system of order n=3 was installed in the supply to a synchronous machine. This likewise results in a zero phase-sequence electrical system of order n=3. Since phase current regulators are present in this special case of simulation, the converter voltages $u_A$, $u_B$ and $u_C$ (FIG. 3) contain a zero phase-sequence system of order n=3 even before the integrators 50 and 52 are enabled. This zero phase-sequence voltage system is not preset correctly in terms of magnitude and phase until the integrators 50 and 52 have been enabled at the time t1, so that the system is a pure first order positive phase-sequence system after the correction process with respect to the current (FIG. 4). FIG. 5 shows the signal waveforms $u0_1$ and $u0_2$ at the outputs of the integrators 50 and 52 of the control channel 26 of the zero phase-sequence system.

Figure 6:
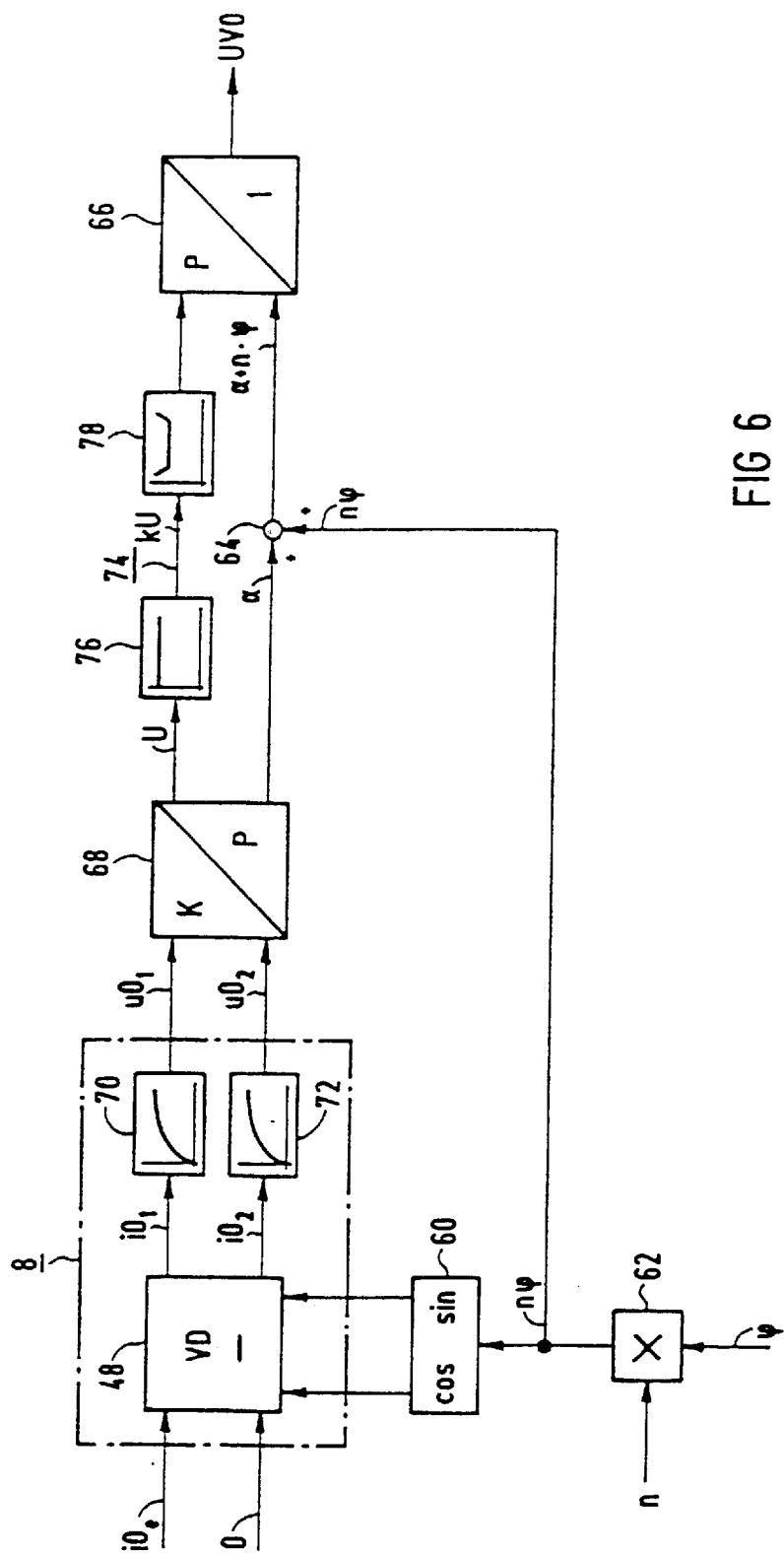
FIG. 6 showing a block diagram of yet another embodiment of the apparatus for carrying out the method according to the present invention.

FIG. 6 shows a particularly advantageous embodiment of the apparatus for carrying out the method for suppression of an n-th order zero phase-sequence electrical system. This apparatus differs from the apparatus shown in FIG. 2 in that first order delay elements 70 and 72 are provided instead of the integrators 50 and 52 in the device 8 for forming a stationary voltage vector $u0_1$ and $u0_2$. In addition, a P regulator 76 with a downstream limiter 78 is arranged in a magnitude channel 74.

In the arrangement shown in FIG. 2, the integrators 50 and 52 drift when limits come into effect. Not only limits on reaching the control limits of a converter-fed system, but also the control of active limits of the voltage vector must be taken into account in this case. In order to solve this problem, first order delay elements 70 and 72 are provided instead of the integrators 50 and 52. In consequence, a permanent control error is deliberately accepted even in the steady state, although this can be influenced by the gain k of the P regulator 76 in the magnitude channel 74. If the magnitude of the voltage vector kU is subsequently limited, this has no influence on the angle component α. This means that, if the magnitude of the voltage vector kU is actively limited, the optimum angle value α+nφ is determined by the circuit, as before. An optimum control result is achieved in these given boundary conditions by using the apparatus shown in FIG. 6. This furthermore ensures that it is impossible for any unlimited drifting to occur when the control limits of a converter-fed system are reached.

This method and this apparatus for carrying out the method allow the control of a direct converter with an open circuit to be modified in such a manner that a direct converter with an open circuit and with a sinusoidal drive can be controlled in this way without the phase currents-containing any third order harmonics, which contribute nothing to the useful power in the load but lead to an unnecessary additional load on the converter. The direct converter with an open circuit and in conjunction with the method according to the present invention thus achieves a useful power output which is comparable with those of direct converters with a concatenated circuit, there being no need to increase the supply voltage provided by the transformer, nor to use inductor coils.

What is claimed is:

1. A method for producing an m-phase/n-th order electrical system in a converter-fed device, the converter-fed device including an m-phase positive phase-sequence system, an m-phase negative phase-sequence system and a zero phase-sequence system, the method comprising the steps of:

for each of the phase-sequence systems, forming an n-th order voltage system;

determining a stationary voltage vector corresponding to an n-th order current component of a respective phase-sequence system;

transforming the determined stationary voltage vector from a reference system into a fixed reference system, the reference system rotating at n-times a fundamental frequency; and for each of the phase-sequence systems, converting the determined stationary voltage vector into m voltage pilot control signals for controlling manipulated variables.

2. The method according to claim 1, wherein each stationary voltage vector of the respective phase-sequence system is determined as a function of a respective m determined actual current value and a respective predetermined nominal value component.

3. The method according to claim 2, wherein the step of determining the stationary voltage vector includes:

forming the n-th order current component using a respective predetermined reference value component and a respective current component, the respective current component being determined as a function of a respective measured phase current of a fixed reference system;

vectorially rotating the formed n-th order control difference component using a sine function and a cosine function at n-times the operating frequency; and delaying the rotated n-th order control difference component.

4. The method according to claim 3, wherein each stationary voltage vector of the respective phase-sequence system includes vector components that are varied as a function of a predetermined gain factor.

5. The method according to claim 1, wherein the step of determining the stationary voltage vector includes:

forming the n-th order current component using a respective predetermined reference value component and a respective current component, the respective current component being determined as a function of a respective measured phase current of a fixed reference system;

vectorially rotating the formed n-th order control difference component using a sine function and a cosine function at n-times the operating frequency; and integrating the rotated n-th order control difference component.

6. An apparatus for producing an m-phase/n-th order electrical system, comprising:

a coordinate converter;

an m-phase positive phase-sequence system forming a first n-th order voltage system and including a first transformation device being coupled to an output of the coordinate converter;

an m-phase negative phase-sequence system forming a second n-th order voltage system and including a second transformation device being coupled to the output of the coordinate converter;

a zero phase-sequence system forming a third n-th order voltage system and including a third transformation device being coupled to the output of the coordinate converter, wherein each of the first, second and third n-th order voltage systems includes a stationary voltage vector corresponding to an n-th order current component of a respective one of the phase-sequence systems, the stationary voltage vector being transformed from a reference system into a fixed reference system, the reference system rotating at n-times a fundamental frequency, wherein each of the n-th order voltage systems are converted into m voltage pilot control signals, the pilot control signals being used for a pilot control of manipulated variables.

7. The apparatus according to claim 6, wherein each of the transformation devices includes an angle function generator having first and second angle outputs, a vector rotator having transformation inputs, and a forming device for forming a transformation variable, wherein the first angle output receives a predetermined value signal, and the second angle output receives signals from forming inputs of the forming device, wherein the transformation inputs are coupled to forming outputs of the forming device, the transformation inputs providing a component of the stationary voltage vector, and wherein the angle function generator includes generator inputs having a corresponding angle operating at any frequency and at any phase.

8. The apparatus according to claim 6, further comprising:

a conversion device having conversion inputs and outputs; and a determining device for determining the stationary voltage vector, the determining device including:
determining inputs coupled to the conversion outputs,
two comparators having non-inverting inputs receiving predetermined nominal value components,
two integrators, and
a vector rotator having transformation inputs and outputs, the transformation inputs being coupled to the determining device for forming the transformation variable, the transformation outputs being coupled to at least one of the two integrators via a respective one of the two comparators, wherein each of the transformation devices is connected to the determining device, and wherein the conversion inputs receiving measured current values.

9. The apparatus according to claim 6, further comprising:

a first forming device for forming the n-th order current component and including first inputs; and at least one second forming device for determining a stationary voltage vector, the second forming device including second inputs and outputs, the second inputs receiving actual inputs m measured current values predetermined nominal value components and being couple to the first outputs, wherein each of the transformation devices is connected to one of the at least one second forming device.

10. The apparatus according to claim 9, wherein each of the at least one second forming device includes:

two integrators, and a vector rotator having transformation inputs and outputs, the transformation inputs being coupled to the at least one second forming device for forming the transformation variable, the transformation outputs being coupled to the two integrators.

11. The apparatus according to claim 9, wherein the first device includes:

a conversion device downstream connected to actual value inputs of the first device and including converting outputs, and a plurality of comparators having inverting and non-inverting inputs, the inverting inputs being coupled to one of the converting outputs, the non-inverting inputs being coupled to a nominal value input of the first device.

12. The apparatus according to claim 9, wherein each of the at least one second forming device includes:

a first coordinate converter, first order delay elements having delay outputs coupled to the first coordinate converter, and a vector rotator having transformation inputs and outputs, the transformation inputs being coupled to the at least one second forming device for forming the transformation variable, the transformation outputs being coupled to the first order delay elements.

13. The apparatus according to claim 12, wherein each of the at least one second forming device further includes:

a second coordinate converter, and a component channel coupling the first coordinate converter with the second coordinate converter, the second coordinate converter including a P regulator and a downstream limiter.

14. A method for producing an m-phase/n-th order electrical system in a converter-fed device, the converter-fed device including an m-phase positive phase-sequence system, an m-phase negative phase-sequence system and a zero phase-sequence system, the method comprising the steps of:

for each of the phase-sequence systems, forming an n-th order voltage system;

determining a stationary voltage vector corresponding to an n-th order current component of a respective phase-sequence system;

transforming the determined stationary voltage vector from a reference system into a fixed reference system, the reference system rotating at n-times a fundamental frequency;

for each of the phase-sequence systems, converting the determined stationary voltage vector into m voltage pilot control signals for controlling manipulated variables; and providing the m voltage pilot control signals to a direct converter having an open circuit.

* * * * *